No. 870,653. PATENTED NOV. 12, 1907.
T. WARSOP.
ROCK DRILL AND OTHER PERCUSSION TOOL.
APPLICATION FILED AUG. 7, 1905.

2 SHEETS—SHEET 2.

Witnesses:

Inventor:
Thomas Warsop
By his Atty.

UNITED STATES PATENT OFFICE.

THOMAS WARSOP, OF CONISTON, ENGLAND.

ROCK-DRILL AND OTHER PERCUSSION TOOL.

No. 870,653.  Specification of Letters Patent.  Patented Nov. 12, 1907.

Application filed August 7, 1905. Serial No. 273,040.

*To all whom it may concern:*

Be it known that I, THOMAS WARSOP, a subject of the King of Great Britain and Ireland, residing at Coniston, in the county of Lancaster, England, have invented certain new and useful Improvements in Rock-Drills and other Percussion-Tools, of which the following is a specification, reference being had therein to the accompanying drawings.

My invention consists of an improved method of actuating rock drills and other percussion tools by motors driven by petrol or other compounds. For this purpose, I use one or more cylinders, the piston or pistons of which are actuated by petrol or other inflammable substance, which is vaporized, compressed and fired therein in the usual manner. The crank shaft of the motor has attached to it suitable gear wheel or wheels driving a second shaft to which is attached one or more cams. This cam or cams forces back one end of one or more bell crank levers pivoted from the drill casing, and the other end of the lever or levers engages with one or more studs or collars on the drill spindle, which is forced up against a spring situated on the spindle in a suitable chamber. At one or more points of the revolution of the cam or cams the spindle is released and forced forward by the spring, so as to make its working or striking stroke. The outer end of this spindle is fitted with a suitable socket for carrying the jumper or other tool for boring holes in rock, or for performing other work. The spindle is also fitted with rotating gear for gradually rotating the spindle in the usual manner; and the whole arrangement is covered in where necessary by a casing, carried by a carriage fitted with a feeding screw and handle—all carried by a tripod, bar, or other suitable means. I attain these objects by the mechanism illustrated in the accompanying drawings, in which:—

Figure 1:
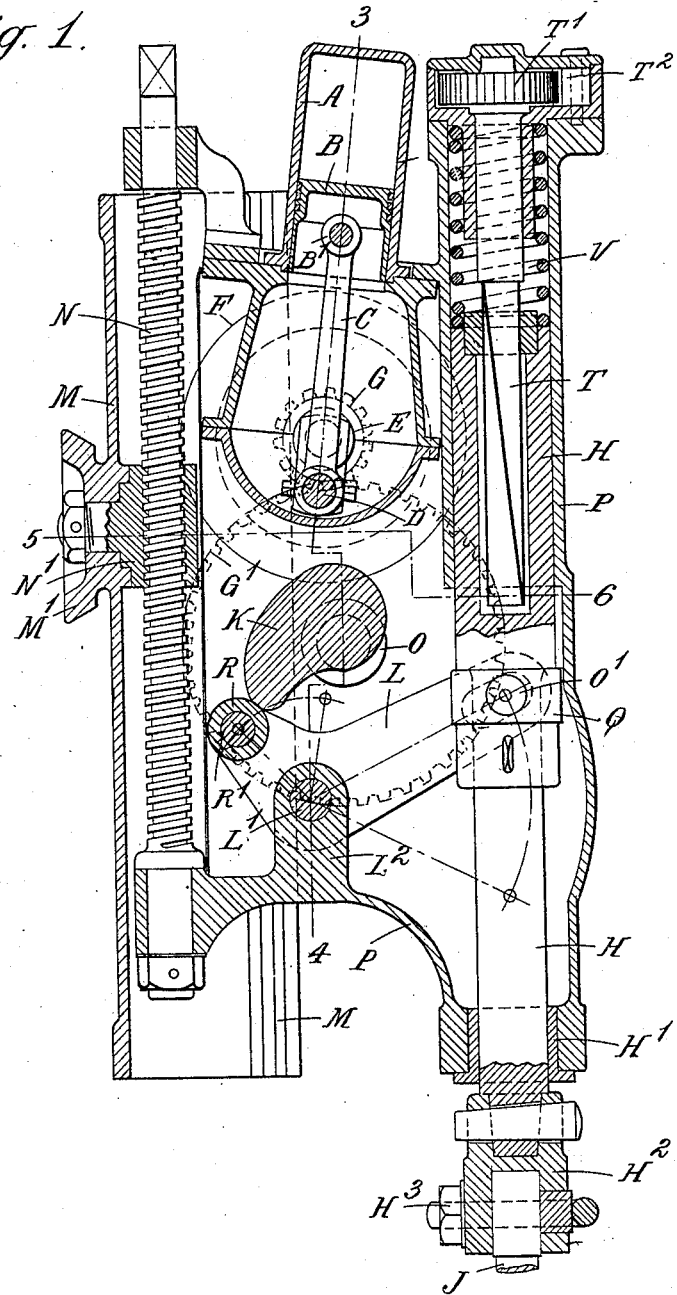
Figure 2:
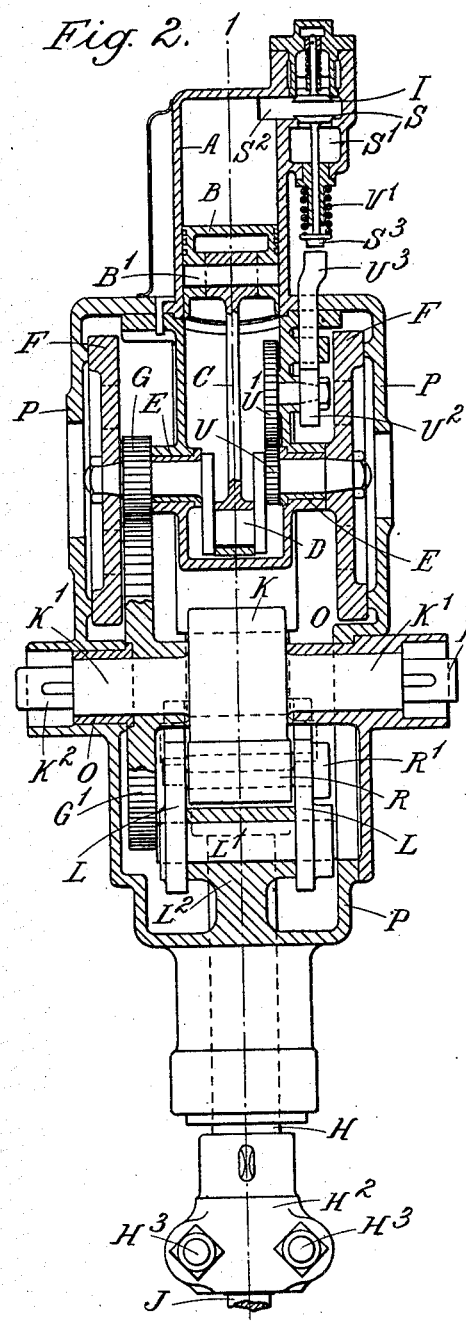
Figure 3:
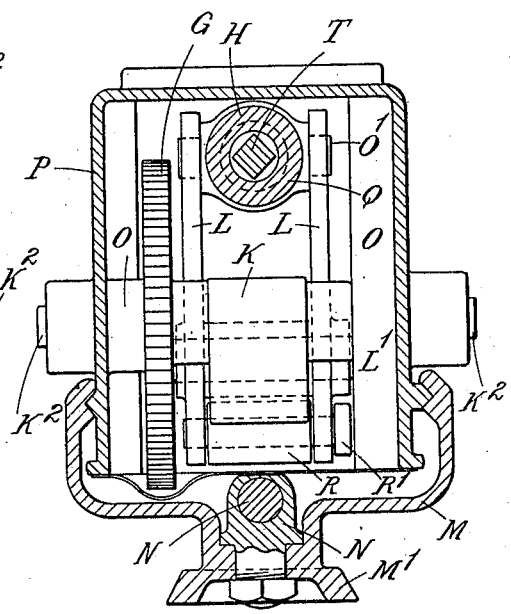

Figure 1 is a vertical section of my improved rock drill on line 1—2 of Fig. 2. Fig. 2 is a vertical section of the same drill on line 3—4 of Fig. 1. Fig. 3 is a transverse section in plan on line 5—6 of Fig. 1.

Similar letters of reference refer to similar parts throughout the several figures.

In these figures, A is the cylinder of the petrol motor; B is the motor piston having the connecting rod C pivoted to same by gudgeon $B^1$ at one end, and actuating at the other end the crank and shaft D.

F, F are two fly wheels fixed on the crank shaft one at each end; E, E are the bearings attached to the motor casing and in which the crank shaft revolves.

G is the pinion on the crank shaft gearing into and driving the spur wheel $G^1$ fixed on the cam shaft $K^1$, which revolves in bearings O, O carried by the drill casing P.

K is the cam, preferably formed in one piece with the shaft $K^1$, which is formed with starting ends $K^2$, on either or both of which a handle is placed for setting the drill in motion, the handle being automatically removed therefrom when the drill is started.

L, L are two bell-crank levers pivoted on each side by pin $L^1$ from bearing $L^2$ attached to casing P.

R is a roller actuated by cam K and turning on pin $R^1$ carried at one end of levers L; the other ends of which engage with studs $O^1$ attached to collar Q cottered to the drill spindle H. The spindle H reciprocates at its lower end in a socket $H^1$ and at its upper end in a chamber formed in casing P. This chamber incloses the spring V—which forces down the spindle H after compression—and also carries the ratchet wheel $T^1$, and twisted bar T; which—by means of the pawl $T^2$ rotates the spindle H in the usual manner.

$H^2$ is a socket, cottered to spindle H, for carrying the jumper or other tool J, which is fixed therein by the clipping bolt and die $H^3$.

It is obvious that if my percussion tool is designed for use where no rotation of the cutting or boring tool is required, then it is merely necessary under such circumstances to omit the ratchet wheel $T^1$ and the pawl $T^2$.

U and $U^1$ are the gear wheels — U fixed on the crank shaft D—for actuating by means of the cam $U^2$ and pusher $U^3$, the tappet $S^3$ and exhaust valve S, carried in a casing attached to the cylinder A in the usual manner. The exhaust gases leave the cylinder by passage $S^2$ past valve S, and thence by outlet $S^1$.

I is the admission valve for admitting to the cylinder A at the necessary times a charge of inflammable mixture from the carbureter, which is placed at any convenient distance away from the drill. The compressed inflammable mixture in cylinder A is ignited by an electric spark or other means, all as is customary in petrol motors.

The mechanism inclosed in casing P slides in grooves formed on each side of the carriage or cradle M, formed with a trunnion $M^1$ for fixing to a tripod stand, bar, or the like in the usual manner.

N is the feeding screw revolving in bearings attached to casing P, and turning in nut $N^1$ attached to the carriage M, for feeding forward the drill as the hole is being bored.

In some cases I may use the chamber containing the spring V as an air pump; in which case the action of the cam K and levers L, L causing a reciprocating action to spindle H will compress on its upward stroke the air contained in the chamber, and thus assist the spring V to impel the spindle H outwards for its working stroke.

What I claim as my invention, and desire to secure by Letters Patent of the United States, is:—

The combination in a percussion tool, of a petrol motor, a shaft driven by said motor, a second shaft geared to the first shaft, a cam on said second shaft, a tool carrying spindle, a pair of bell crank levers pivoted intermediate their ends, the outer ends of said bell crank levers being connected to said spindle, a cam roller mounted between the inner ends of said bell crank levers and in the path of said cam, whereby said cam will move said spindle in one direction and a spring for moving the spindle in the other direction.

In testimony whereof I have affixed my signature in presence of two witnesses.

THOMAS WARSOP.

Witnesses:
 W. H. ATKINSON,
 H. G. JAMES.